United States Patent
Welstead, Jr.

[15] 3,666,761
[45] May 30, 1972

[54] 1-(4-PHENYL-1-PIPERIZINYL METHYL)-CYCLOPROPA[A] NAPHTHALENES AND CYCLOPROP[A] INDENES

[72] Inventor: William John Welstead, Jr., Richmond, Va.

[73] Assignee: A. H. Robins Company, Incorporated, Richmond, Va.

[22] Filed: July 16, 1969

[21] Appl. No.: 842,354

[52] U.S. Cl. ............260/268 TR, 260/268 PH, 260/293.56, 260/313.1, 260/326.5 N, 260/326.8, 260/326.81, 424/250, 424/267, 424/274
[51] Int. Cl. .......................................................C07d 51/70
[58] Field of Search ....................260/268 TR, 293 DB, 469

[56] References Cited

UNITED STATES PATENTS

| | | | |
|---|---|---|---|
| 3,010,972 | 11/1961 | Kaiser et al. | 260/469 X |
| 3,098,076 | 7/1963 | Baltzly | 260/469 X |
| 3,419,604 | 12/1968 | Kaiser et al. | 260/268 X |

Primary Examiner—Donald G. Daus
Attorney—G. William King and Norman D. Dawson

[57] ABSTRACT

Cis and trans-1-(nitrogen-heterocyclylmethyl)cyclopropa[a]naphthalenes and 1-(nitrogen-heterocyclylmethyl)cycloprop[a]indenes useful as anti-inflammatory agents are disclosed. The trans isomers are prepared by reacting 1,1a,6,6a-tetrahydro-1H-cycloprop[a]indenecarbonyl chloride and 1a,2,3,7b-tetrahydro-1H-cyclopropa[a]naphthalenecarbonyl chloride with a nitrogen-containing heterocyclic compound and reducing the amide with lithium aluminum hydride to give the reduced compounds. The cis isomers are prepared by reacting equimolar amounts of cis-1,1a,6,6a-tetrahydro-1H-cycloprop[a]indenecarboxylic acid and cis-1a,2,3,7b-tetrahydro-1H-cyclopropa[a]naphthalenecarboxylic acid, a nitrogen-heterocyclic compound and dicyclohexylcarbodiimide and reducing the amides obtained thereby.

6 Claims, No Drawings

1-(4-PHENYL-1-PIPERIZINYL METHYL)-CYCLOPROPA[A]$_{CYCLOPROP}$[A]INDENES

The present invention relates to novel ring condensed nitrogen containing heterocyclic methylcyclopropanes and is more particularly concerned with 1-(nitrogen-heterocyclylmethyl) cyclopropa[a]naphthalenes and 1-(nitrogen-heterocyclylmethyl) cycloprop[a]indenes, therapeutic compositions containing the same as active ingredients, and methods of making and administering said compounds and compositions.

The novel compounds of the invention are represented by the following structural formula:

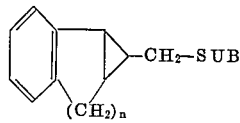

Formula I wherein;

SUB is a heterocyclic radical selected from 4-phenylpiperidinyl, 4-benzylpiperidinyl, 4-phenylpiperazinyl, 4-phenyl-1,2,3,6-tetrahydropyridinyl, 3-phenylpyrrolidinyl and 3-phenyl-3-pyrrolinyl, wherein said phenyl is unsubstituted phenyl and monosubstituted phenyl, wherein the monosubstituent is selected from lower alkyl, lower alkoxy, trifluoromethyl and halogen of atomic weight less than eighty, $n$ is a positive integer from 1 to 2 inclusive, and non-toxic acid addition salts thereof.

The present invention resides in the linkage of the heterocyclic moieties to the cyclopropa[a]naphthalenes and cycloprop [a]indenes by a methylene group, the novel compounds resulting therefrom possessing useful pharmacological activity. The pharmacological action of the novel compounds of the present invention resides in their ameliorating effects on inflamed cellular sites. The activity is demonstrated when the compounds are used in the form of the free base or in the form of their non-toxic acid addition salts. The preferred form of the compounds is as their non-toxic acid addition salts for increased water solubility and ease of administration.

As described hereinabove, the novel compounds of the present invention have an ameliorating effect against inflamed cellular sites and are therefore useful as anti-inflammatory agents. In particular, among the novel compounds of the present invention which have been shown to possess anti-inflammatory action, the compounds of Examples 1 and 6, namely, trans-1-(4-phenyl-1-piperazinylmethyl)-1a,2,3,7b-tetrahydro-1H-cyclopropa[a]naphthalene and trans-1-[4-(4-anisyl)-1-piperazinylmethyl]-1a,2,3,7b-tetrahydro-1H-cyclopropa[a]naphthalene hydrochloride are preferred. The anti-inflammatory action was demonstrated using a modified method of carrageenin-induced edema in the hind paw of the rat (C. A. Winder et al., Proc. Soc. Exp. Biol. Med. III, 544, 1962). Inflammatory edema resulting from the injection of carrageenin in the rat paw was significantly inhibited when the compounds of Examples 1 and 6 were administered orally at doses of 10 to 100 mg./kg., the preferred dose being 20 to 40 mg./kg. The compound of Example 1 was also tested and compared with known antiphlogistic agents in rats using a modified method of the granuloma pouch test (A. Robert and J. E. Nezamis, Acta. Endocrinologia, 25, 105, 1957); there was a marked decrease in the weight of pouch exudate at an oral dose of about 20–60 mg./kg. A preferred oral dose was 30 to 40 mg./kg.

It is, therefore, an object of the present invention to provide novel 1-(nitrogen-heterocyclylmethyl)cyclopropa[a]naphthalenes and 1-(nitrogen-heterocyclylmethyl)cycloprop[a]indenes having utility as anti-inflammatory agents. Another object is to provide methods for producing the novel compounds, therapeutic compositions containing the same and methods for the utilization thereof. Other objects of this invention will be apparent to one skilled in the art and still other objects will become apparent hereinafter.

In the definition of symbols in the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, propyl, isopropyl, butyl, tertiary butyl, amyl, hexyl, octyl, and the like. "Lower-alkoxy"has the formula -O-lower alkyl.

When halogen is referred to herein, preferably but not necessarily a halogen of atomic weight less than eighty is employed. Of the halogens, chlorine is preferred.

By "phenyl" is meant the unsubstituted and the monosubstituted phenyl radical. Among the suitable substituted phenyl radicals are phenyl radicals substituted by any radical which is not reactive or otherwise interfering under the conditions of reaction such as lower-alkoxy, lower-alkyl, trifluoromethyl, and halo. The lower-alkyl and lower-alkoxy substituents have preferably from one to four carbon atoms which can be arranged as straight or branched chains.

The compounds of Formula I may be converted to and are most conveniently employed in the form of non-toxic pharmaceutically acceptable acid addition salts. Such salts also have improved water solubility. Although the non-toxic salts are preferred, any salt may be prepared for use as a chemical intermediate, as in the preparation of another but non-toxic acid addition salt. The free basic compounds of Formula I may be conveniently converted to their acid addition salts by reaction of the free base with the selected acid, preferably in the presence of an organic solvent inert to the reactants and reaction products under the conditions of the reaction. The acids which can be used to prepare the preferred non-toxic acid addition salts are those which produce, when combined with the free base, salts, the anions of which are relatively innocuous to the animal organism in therapeutic doses of the salts, so that beneficial physiological properties inherent in the free bases are not vitiated by side effects ascribable to the anions.

Appropriate acid addition salts are those derived from mineral acids such as hydrochloric acid, hydrobromic acid, hydriodic acid, nitric acid, sulfuric acid, and phosphoric acid, and organic acids such as maleic acid, oxalic acid, lactic acid, fumaric acid, and tartaric acid. The preferred acid addition salt is the hydrochloride.

The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely, the free base may be obtained conventionally by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling or in other conventional manner.

The starting materials used in preparing the novel compounds are ethyl 1,1a,6,6a-tetrahydro-1H-cycloprop[a]indenecarboxylate and ethyl 1a,2,3,7b-tetrahydro-1H-cyclopropa[a]naphthalene-carboxylate which are prepared by modified methods described in U.S. Pat. No. 3,010,972 and in Chem. Ber. 94, 2332 (1962). An excess of indene or naphthalene is reacted with ethyl diazoacetate in the presence of a catalyst such as copper sulfate or copper cyanide. The resulting ester is purified, usually by distillation in vacuo. Saponification of the ester yields the corresponding acid which is isolated by acidifying the basic hydrolysate and collecting the resulting precipitate. Following recrystallization from ethanol-water, the isomeric mixture of carboxylic acids is dissolved in a dilute basic solution and partially neutralized with hydrochloric acid to obtain primarily the crude trans isomer which is further purified by crystallization. Complete neutralization of the basic solution precipitates the crude cis isomer which is purified by repeated crystallization from a suitable solvent.

The novel compounds of the present invention are prepared as shown in Chart I.

CHART I

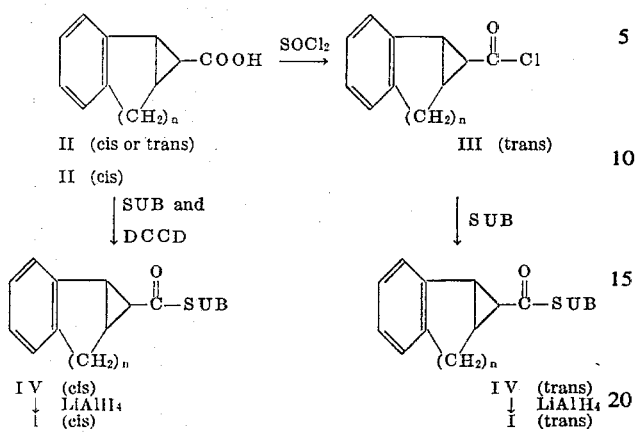

DCCD is dicyclohexylcarbodiimide.
SUB is nitrogen heterocyclic radical.

The trans-isomers of the novel compounds are prepared by treating 1,1a,6,6a-tetrahydro-1H-cycloprop[a]indenecarboxylic acid (II), or 1a,2,3,7b-tetrahydro-1H-cyclopropa[a]naphthalene-carboxylic acid (II) with phosphorous trichloride, phosphorous pentachloride or thionyl chloride, thionyl chloride being preferred, to give the acid chloride (III). The acid chloride (III) is reacted with a nitrogen-containing heterocyclic compound to give the amides of Formula IV. The latter reaction is generally carried out in a suitable inert organic solvent such as benzene, chloroform, dioxane, toluene, acetonitrile and the like. An acid acceptor such as a tertiary amine or an alkali metal salt of a weak acid, such as sodium carbonate, sodium bicarbonate, potassium carbonate and the like, may be used, an alkali metal salt being preferred. Alternatively, the reaction described above can be conveniently carried out in a chloroform-water mixture. The alternate method is particularly convenient when the acid acceptor employed is an alkali metal salt of a weak acid. The reaction is generally carried out at or about room temperature for a period of from about 2 to 4 hours. Isolation of the amide (IV) is achieved by dilution of the reaction mixture with water, separation of the organic and aqueous layers, and drying and concentration of the organic layer. The crude products are purified by crystallization from a suitable solvent such as benzene, isopropyl ether, benzene-isooctane, and the like.

When either cis-1a,2,3,7b-tetrahydro-1H-cyclopropa[a]n aphthalenecarboxylic acid or cis-1,1a,6,6a-tetrahydro-1H-cycloprop[a]indenecarboxylic acid is treated with thionyl chloride, it is epimerized to the corresponding trans-isomer. Therefore, in preparing novel compounds of the invention having the cisconfiguration, cis-1a,2,3,7b-tetrahydro-1H-cyclopropa[a]naphthalenecarboxylic acid (II) or cis-1,1a,6,6a-tetrahydro-1H-cycloprop [a]indenecarboxylic acid (II) is reacted with approximately equimolar amounts of a nitrogen-containing heterocyclic compound and dicyclohexylcarbodiimide (DCCD) in an inert solvent such as methylene chloride. The reaction is generally carried out at or about room temperature for a period of from about 3 to 5 hours. The crude amide is usually isolated by filtering off the insoluble solids and acid-base extraction of the filtrate. The organic layer is dried and concentrated to an oil and the residual crude amide is purified by crystallization.

The reduction of the precursor amides (IV) to the novel 1(nitrogen-heterocyclylmethyl)-1,1a,6,6a-tetrahydro-1H-cycloprop[a]indenes (I) and 1-(nitrogen-heterocyclylmethyl)-1a,2,3,7b-tetrahydro-1H-cyclopropa[a]naphthalenes (I) of the present invention is achieved by alkali metal hydride reduction in anhydrous ether. The amide is dissolved or suspended in ether and added dropwise, under nitrogen, to a stirred suspension of lithium aluminum hydride in ether. The stirred reaction mixture is refluxed for a period of from about 2 to 5 hours. The excess lithium aluminum hydride is decomposed by the addition of water and the organic layer is separated and concentrated in vacuo. The crude residual basic material is purified by crystallization or it is converted to an organic or inorganic acid addition salt which is further purified by crystallization from a suitable solvent.

Preparation 1

Cis and trans-1,1a,6,6a-tetrahydro-1H-cycloprop[a]i ndenecarboxylic Acid.

a. To a stirred solution of 38 g. (0.19 mole) of ethyl-1,1a,6,6a-tetrahydro-1H-cycloprop[a]indenecarboxylate and 200 ml. of 95% ethanol was added 25 g. (0.62 mole) of sodium hydroxide in 40 ml. of water. The reaction mixture was refluxed under nitrogen for 6 hours. The cooled hydrolysate was acidified with dilute hydrochloric acid and the resulting white precipitate was filtered and dried to give 29.5 g. (90 percent yield) of product which melted at 115°–140° C.

b. The 29.0 g. (0.17 mole) of acid prepared in step (a) was suspended in 1,500 ml. of water and 90 ml. of 2N sodium hydroxide (0.18 mole) was added with stirring. After the acid had dissolved, 135 ml. of 1N hydrochloric acid was added. The resulting precipitate was filtered and dried to give 20 g. of trans-1,1a,6,6a-tetrahydro-1H-cycloprop[a]i ndenecarboxylic acid. Repeated crystallization from benzene gave 11.5 g. of the trans isomer which melted at 139°–142° C.

Analysis: Calculated for $C_{11}H_9O_2$; C,75.84; H,5.79
Found : C,76.26; H,5.89 c. The acidic filtrate from step (b) was treated with 50 ml. of 1N hydrochloric acid and the resulting precipitate was filtered and dried to yield 8 g. of cis-1,1a,6,6a-tetrahydro-1H-cycloprop[a]indenecarboxylic acid. Crystallization from chloroform gave 4.5 g. of the cis-isomer which melted at 161°–163° C.

Analysis: Calculated for $C_{11}H_9O_2$: C,75.84; H,5.79
Found : C,75.44; H,5.80

Preparation 2

Cis and trans-1a,2,3,7b-tetrahydro-1H-cyclopropa[a]n aphthalenecarboxylic Acid.

Utilizing the procedure of Preparation 1, 58 g. (0.27 mole) of ethyl-1a,2,3,7b-tetrahydro-1H-cyclopropa[a]naphthalene-carboxylate was hydrolyzed using 33 g. (0.825 mole) of sodium hydroxide to give 44 g. of the corresponding acid. Following crystallization from ethanol-water, the isomeric mixture melted at 145°–160° C.

The cis and trans isomers were separated by partial neutralization in a similar manner to Preparation 1(b) and (c). The first fraction, trans-1a,2,3,7b-tetrahydro-1H-cyclopropa[a]naphthalenecarboxylic acid, weighed 30 g. and melted at 161°–162° C. following crystallization from ethanol-water.

Analysis: Calculated for $C_{12}H_{12}O_2$: C,76.57; H,6.42
Found : C,76.67; H,6.51

The second crystalline fraction, cis-1a,2,3,7b-tetrahydro-1 H-cyclopropa[a]naphthalenecarboxylic acid weighed 7.6 g. and melted at 161°–163° C. following crystallization from benzene-petroleum ether (30°–60° C.). Nuclear magnetic resonance confirmed the designated configurations.

Analysis: Calculated for $C_{12}H_{12}O_2$: C,76.57; H,6.42
Found : C,76.64; H,6.56

Preparation 3 trans-1-(4-Phenyl-1-piperazinylcarbonyl)-1a,2,3,7b-tetrahydro-1H-cyclopropa[a]naphthalene.

A solution of 3 g. (0.016 mole) of trans-1a,2,3,7b-tetrahydro-1H-cyclopropa[a]naphthalenecarboxylic acid and 4 ml. of thionyl chloride was stirred at room temperature 18 hours. The excess thionyl chloride was removed in vacuo. To the resulting acid chloride, dissolved in 10 ml. of dry benzene, was added dropwise, with stirring, 2.58 g. (0.016 mole) of 4-phenylpiperazine in 40 ml. of dry benzene. The reaction mixture was stirred two hours at room temperature, treated with 50 ml. of 1.5N sodium hydroxide solution and stirred 30 minutes. The heterogeneous mixture was filtered and the precipitate was washed with water. The filtrate was separated and the benzene layer was dried over magnesium sulfate. The solid precipitate and the benzene filtrate were combined and treated with warm isooctane. On cooling, 4.2 g. (80 percent) of amide crystallized and melted at 193°–194° C.

Analysis:
Calculated for $C_{22}H_{24}N_2O$:   C,79.48; H,7.28; N,8,43
Found   :   C,79.28; H,7.24; N,8.75

Preparation 4 cis-1-(4-Phenyl-1-piperazinylcarbonyl)-1a,2,3,7b-tetrahydro-1H-cyclopropa[a]naphthalene.

A mixture of 2.4 g. (0.013 mole) of cis-1a,2,3,7b-tetrahydro-1H-cyclopropa[a]naphthalenecarboxylic acid, 2.64 g. (0.013 mole) of dicyclohexylcarbodiimide and 2.1 g. (0.013 mole) of 4-phenylpiperazine in 30 ml. of methylene chloride was stirred at room temperature 4 hours. The insoluble urea was filtered off and the filtrate was acid-base extracted. The organic layer was dried over magnesium sulfate and concentrated to an oil in vacuo. Crystallization of the crude oil from ethanol-water gave 2.5 g. (59 percent yield) of product which melted at 124°–126° C.

Analysis:
Calculated for $C_{22}H_{24}N_2O$:   C,79.48; H,7.28; N,8.43
Found   :   C,79.28; H,7.32; N,8.63

Utilizing the procedure of Preparation 4, the following intermediates are prepared by reacting equimolar amounts of the stated ingredients:

cis-1-[4-(4-anisyl)-1-piperazinylcarbonyl]-1,1a,6,6a-tetrahydro-1H-cycloprop[a]indene is prepared by reacting cis-1,1a,6,6a-tetrahydro-1H-cycloprop[a]indenecarboxylic acid, 4-(4-anisyl)piperazine and dicyclohexylcarbodiimide;

cis-1-[3-(4-fluorophenyl)-1-pyrrolidinylcarbonyl]-1,1a,6,6a-tetrahydro-1H-cycloprop[a]indene is prepared by reacting cis-1,1a,6,6a-tetrahydro-1H-cycloprop[a]indenecarboxylic acid, 3-(4-fluorophenyl)pyrrolidine and dicyclohexylcarbodiimide;

cis-1-[3-(3-trifluoromethylphenyl)-1-(3-pyrrolinyl)carbonyl]1,1a,6,6a-tetrahydro-1H-cycloprop[a]indene is prepared by reacting cis-1,1a,6,6a-tetrahydro-1H-cycloprop[a]indenecarboxylic acid, 3-(3-trifluoromethylphenyl)-3-pyrroline and dicyclohexylcarbodiimide;

cis-1-(4-phenyl-1-piperidinylcarbonyl)-1a,2,3,7b-tetrahydro-1H-cyclopropa[a]naphthalene is prepared by reacting cis-1a,2,3,7b-tetrahydro-1H-cyclopropa[a]naphthalenecarboxylic acid, 4-phenylpiperidine and dicyclohexylcarbodiimide;

cis-1-[4-(4-tolyl)-1,2,3,6-tetrahydro-1-pyridinylcarbonyl]-1a,2,3,7b-tetrahydro-1H-cyclopropa[a]naphthalene is prepared by reacting cis-1a,2,3,7b-tetrahydro-1H-cyclopropa[a]naphthalene-carboxylic acid, 4-(4-tolyl)-1,2,3,6-tetrahydropyridine and dicyclohexylcarbodiimide;

cis-1-[4-(4-anisyl)-1,2,3,6-tetrahydro-1-pyridinylcarbonyl]-1,1a,6,6a-tetrahydro-1H-cycloprop[a]indene is prepared by reacting cis-1,1a,6,6a-tetrahydro-1H-cycloprop[a]indenecarboxylic acid, 4-(4-anisyl)-1,2,3,6-tetrahydropyridine and dicyclohexylcarbodiimide;

cis-1-[3-(2-anisyl)-1-pyrrolidinylcarbonyl]-1a,2,3,7b-tetrahydro-1H-cylopropa[a]naphthalene is prepared by reacting cis-1a,2,3,7b-tetrahydro-1H-cyclopropa[a]n aphthalenecarboxylic acid, 3-(2-anisyl)pyrrolidine and dicyclohexylcarbodiimide;

cis-1-[4-(2-ethoxyphenyl)-1-piperidinylcarbonyl]-1a,2,3,7b-tetrahydro-1H-cyclopropa[a]naphthalene is prepared by reacting cis-1a,2,3,7b-tetrahydro-1H-cyclopropa[a]naphthalenecarboxylic acid, 4-(2-ethoxyphenyl)piperidine and dicyclohexylcarbodiimide;

cis-1(4-benzyl-1-piperidinylcarbonyl)-1,1a,6,6a-tetrahydro-1H-cycloprop[a]indene is prepared by reacting cis-1,1a,6,6a-tetrahydro-1H-cycloprop[a]indenecarboxylic acid, 4-benzylpiperidine and dicyclohexylcarbodiimide;

cis-1-[4-(4-chlorophenyl)-1-piperazinylcarbonyl]-1,1a,6,6a-tetrahydro-1H-cycloprop[a]indene is prepared by reacting cis-1,1a,6,6a-tetrahydro-1H-cycloprop[a]indenecarboxylic acid, 4-(4-chlorophenyl)piperazine and dicyclohexylcarbodiimide.

Preparation 5

Trans-1-(4-phenyl-1-piperazinylcarbonyl)-1,1a,6,6a-tetrahydro-1H-cycloprop[a]indene.

A mixture of 6.5 g. (0.04 mole) of 1,1a,6,6a-tetrahydro-1H-cycloprop[a]indenecarboxylic acid and 20 ml. of thionyl chloride was stirred at room temperature for 18 hours, and the excess thionyl chloride was removed in vacuo. The residual acid chloride was dissolved in 20 ml. of chloroform and added dropwise, with stirring, to a mixture containing 6.05 g. (0.04 mole) of 4-phenylpiperazine dissolved in 20 ml. of chloroform, 10 g. of potassium carbonate and 25 ml. of crushed ice. When the reaction mixture reached room temperature, the chloroform layer was separated, dried over magnesium sulfate and concentrated to a semi-solid. Crystallization of the crude residue from benzene gave 9.2 g. (80 percent) of product which melted at 187°–189° C.

Analysis:
Calculated for $C_{21}H_{22}N_2O$:   C,79.21; H,6.96; N,8.80
Found   :   C,79.17; H,6.93; N,8.57

By following the manipulative procedure of Preparation 5, the following intermediates are prepared:

Preparation 6

Trans-1-[4-(4-anisyl)-1-piperazinylcarbonyl]-1a,2,3,7b-tetrahydro-1H-cyclopropa[a]naphthalene.

The acid chloride obtained from 4 g. (0.02 mole) of trans-1a,2,3,7b-tetrahydro-1H-cyclopropa[a]naphthalenecarboxylic acid was reacted with 5.6 g. (0.02 mole) of 4-(4-anisyl)piperazine dihydrochloride. The resulting product was crystallized from benzene-isooctane, melted at 165–167° C. and weighed 6.2 g. (76% yield).

Analysis:
Calculated for $C_{23}H_{26}N_2O_2$:   C,76.21; H,7.23; N,7.73
Found   :   C,75.98; H,7.26; N,7.60

Preparation 7

Trans-1-[4-(4-chlorophenyl)-1,2,3,6-tetrahydro-1-pyridinyl-carbonyl]-1a,2,3,7b-tetrahydro-1H-cyclopropa[a]naphthalene.

The acid chloride obtained from 6 g. (0.032 mole) of trans-1a,2,3,7b-tetrahydro-1H-cyclopropa[a]naphthalenecarboxylic acid was reacted with 7.4 g. (0.032 mole) of 4-(4-chlorophenyl)-1,2,3,6-tetrahydropyridine hydrochloride. The resulting product was crystallize from isopropyl ether, melted at 154°–156° C. and weighed 9.5 g. (82 percent yield).

Analysis:
Calculated for $C_{23}H_{22}ClNO$:   C,75.91; H,6.09; N,3.85
Found   :   C,75.95; H,6.09; N,3.98

Preparation 8

Trans-1-(4-benzyl-1-piperidinylcarbonyl)-1a,2,3,7b-tetrahydro-1H-cyclopropa[a]naphthalene.

The acid chloride obtained from 6 g. (0.032 mole) of trans-1a,2,3,7B-tetrahydro-1H-cyclopropa[a]naphthalenecarboxylic acid was reacted with 5.6 g. (0.032 mole) of 4-benzyl-piperidine. The resulting product was crystallized from isopropyl ether, melted at 120°–122° C. and weighed 8.2 g. (75 percent yield).

Analysis:
Calculated for $C_{24}H_{27}NO$:     C,83.43; H,7.88; N,4.05
Found                      :     C,83.38; H,7.96; N,4.10

Preparation 9

Trans-1-(4-Phenyl-1,2,3,6-tetrahydro-1-pyridinylcarbonyl)-1a,2,3,7b-tetrahydro-1H-cyclopropa[a]naphthalene.

The acid chloride prepared from 6 g. (0.032 mole) of trans-1a,2,3,7b-tetrahydro-1H-cyclopropa[a]naphthalenecarboxylic acid was reacted with 6.25 g. (0.032 mole) of 4-phenyl-1,2,3,6-tetrahydropyridine hydrochloride. Crystallization of the crude residue from benzene-isooctane gave 9 g. (86 percent yield) of product which melted at 191°–193° C.

Analysis:
Calculated for $C_{23}H_{23}NO$:     C,83.85; H,7.04; N,4.25
Found                      :     C,83.78; H,7.04; N,4.35

Utilizing the procedures of Preparations 5 through 9, the following intermediates are prepared by reacting equimolar amounts of the stated ingredients:

trans-1-[4-(3-trifluoromethylphenyl)-1-piperidinylcarbonyl]-1a,2,3,7b-tetrahydro-1H-cyclopropa[a]naphthalene is prepared from trans-1a,2,3,7b-tetrahydro-1H-cyclopropa[a]naphthalenecarbonyl chloride and 4-(3-trifluoromethylphenyl)piperidine;

trans-1-[4-(4-anisyl)-1-piperidinylcarbonyl]-1,1a,6,6a-tetrahydro-1H-cycloprop[a]indene is prepared from trans-1,1a,6,6a-tetrahydro-1H-cycloprop[a]indenecarbonyl chloride and 4-(4-anisyl)piperidine;

trans-1-(3-phenyl-1-pyrrolidinylcarbonyl)-1a,2,3,7b-tetrahydro-1H-cyclopropa[a]naphthalene is prepared from trans-1a,2,3,7b-tetrahydro-1H-cyclopropa[a]naphthalenecarbonyl chloride and 3-phenylpyrrolidine;

trans-1-[3-(4-ethoxyphenyl)-1-(3-pyrrolinyl)carbonyl]-1a,2,3,7b-tetrahydro-1H-cyclopropa[a]naphthalene is prepared from trans-1a,2,3,7b-tetrahydro-1H-cyclopropa[a]naphthalene carbonyl chloride and 3-(4-ethoxyphenyl)-3-pyrroline;

trans-1-[4-(4-fluorophenyl)-1,2,3,6-tetrahydro-1-pyridinylcarbonyl]-1,1a,6,6a-tetrahydro-1H-cycloprop[a]indene is prepared from trans-1,1a,6,6a-tetrahydro-1H-cycloprop[a]indenecarbonyl chloride and 4-(4-fluorophenyl)-1,2,3,6-tetrahydropyridine;

trans-1-(4-benzyl-1-piperidinylcarbonyl)-1,1a,6,6a-tetrahydro-1H-cycloprop[a]indene is prepared from trans-1,1a,6,6a-tetrahydro-1H-cycloprop[a]indenecarbonyl chloride and 4-benzyl-piperidine;

trans-1-[3-phenyl-1-(3-pyrrolinyl)carbonyl]-1,1a,6,6a-tetrahydro-1H-cycloprop[a]indene is prepared from trans-1,1a,6,6a-tetrahydro-1H-cycloprop[a]indenecarbonyl chloride and 3-phenyl-3-pyrroline;

trans-1-[3-(3-tolyl)-1-pyrrolidinylcarbonyl]-1,1a,6,6a-tetrahydro-1H-cycloprop[a]indene is prepared from trans-1,1a,6,6a-tetrahydro-1H-cycloprop[a]indenecarbonyl chloride and 3-(3-tolyl)pyrrolidine.

The examples below illustrate in detail some of the compounds which comprise this invention and methods for their production. This invention contemplates the cis and trans isomers as well as mixtures of cis and trans isomers. This invention is not to be construed as limited thereby in spirit or scope. It will be apparent to one skilled in the art that numerous modifications in materials and methods can be adopted without departing from the invention.

EXAMPLE 1

Trans-1-(4-Phenyl-1-piperazinylmethyl)-1a,2,3,7b-tetrahydro-1H-cyclopropa[a]naphthalene.

A suspension of 3.7 g. (0.012 mole) of trans-1-(4-phenyl-1-piperazinylcarbonyl)-1a,2,3,7b-tetrahydro-1H-cyclopropa[a]naphthalene in 100 ml. of anhydrous ether was added dropwise, under nitrogen, to a stirred suspension of 1 g. (0.026 mole) of lithium aluminum hydride in 50 ml. of ether. The mixture was refluxed 3 hours, cooled and treated with water saturated with magnesium sulfate. The inorganic salts were filtered and washed with ether. The combined ether fractions were concentrated to an oil. The residual oil was crystallized from ethanol water to give 3.5 g. (89 percent) of product which melted at 89°–92° C. The analytical sample was recrystallized from ethanol-water and melted at 90°–92° C.

Analysis:   Calculated for $C_{22}H_{26}N_2$:     C,82.97; H,8.23
            Found       :   C,83.08; H,8.34

EXAMPLE 2

Trans-1-(4-Phenyl-1-piperazinylmethyl)-1,1a,6,6a-tetrahydro-1H-cycloprop[a]indene Hydrochloride Hydrate.

To a stirred suspension of 1.86 g. (0.049 mole) of lithium aluminum hydride in 50 ml. of anhydrous ether, under nitrogen, was added dropwise a suspension of 7.8 g. (0.0245 mole) of trans-1-(4-phenyl-1-piperazinylcarbonyl)-1,1,a,6,6a-tetrahydro-1H-cycloprop[a]indene in 200 ml. of ether. The mixture was refluxed 3 hours, the excess lithium aluminum hydride was decomposed by the addition of 2 ml. of water, 2 ml. of 5N sodium hydroxide solution and 60 ml. of water. The mixture was filtered and the filtrate was dried over magnesium sulfate and concentrated to an oil. The crude oil was converted to the hydrochloride salt which was crystallized from methanol-isopropyl ether, weighed 7.7 g. (88 percent) and melted at 247°–248° C. with decomposition.

Analysis:
Calculated for $C_{21}H_{27}N_2OCl$:     C,70.27; H,7.58; N,7.81
Found                         : C,70.15; H,7.13; N,7.63

Utilizing the procedure of Examples 1 and 2, the following compounds are prepared:

EXAMPLE 3

Trans-1-[4-(4-chlorophenyl)-1,2,3,6-tetrahydro-1-pyridinyl-methyl]-1a,2,3,7b-tetrahydro-1H-cyclopropa[a]naphthalene Hydrochloride.

A suspension of 8.1 g. (0.0273 mole) of trans-1-[4-(4-chlorophenyl)-1,2,3,6-tetrahydro-1-pyridinylcarbonyl]-1a,2,3,7b-tetrahydro-1H-cyclopropa[a]naphthalene was reduced using 1.74 g. (0.045 mole) of lithium aluminum hydride. The crude product was converted to the hydrochloride salt which was crystallized from isopropanol-isopropyl ether, weighed 7 g. (67 percent yield) and melted at 212°–215° C. with decomposition.

Analysis:
Calculated for $C_{23}H_{25}NCl_2$:     C,71.50; H,6.52; N,3.63
Found                     :     C,71.21; H,6.46; N,3.57

EXAMPLE 4

Cis-1-(4-phenyl-1-piperazinylmethyl)-1a,2,3,7b-tetrahydro-1H-cyclopropa[a]naphthalene.

A suspension of 2.2 g. (0.0067 mole) of cis-1-(4-phenyl-1-piperazinylcarbonyl)-1a,2,3,7b-tetrahydro-1H-cyclopropa[a]naphthalene was reduced using 0.49 g. (0.013 mole) of lithium aluminum hydride. The product was crystallized from methanol-water, weighed 1.95 g. (91% yield) and melted at 71°–74 C.

Analysis:
Calculated for $C_{22}H_{26}N_2$:     C,82.97; H,8.23; N,8.80
Found                  :     C,82.48; H,8.14; N,8.60

EXAMPLE 5

Trans-1-(4-Benzyl-1-piperidinylmethyl)-1a,2,3,7b-tetrahydro-1H-cyclopropa[a]naphthalene Hydrochloride.

A suspension of 6.9 g. (0.02 mole) of trans-1-(4-benzyl-1-piperidinylcarbonyl)-1a,2,3,7b-tetrahydro-1H-cyclopropa[a]naphthalene was reduced using 1.52 g. (0.04 mole) of lithium aluminum hydride. The crude product was converted to the hydro-chloride salt which was crystallized from isopropanol-isopropyl ether, weighed 6.2 g. (84 percent yield) and melted at 179°–182° C.

Analysis:
Calculated for $C_{24}H_{30}NCl$:    C,78.34; H,8.22; N,3.81
Found             :   C,77.90; H,8.23; N,3.76

EXAMPLE 6

Trans-1-[4-(4-Anisyl)-1-piperazinylmethyl]-1a,2,3,7b-tetrahydro-1H-cyclopropa[a]naphthalene Hydrochloride.

A suspension of 5 g. (0.013 mole) trans-1-[4-(4-anisyl)-1-piperazinylcarbonyl]-1a,2,3,7b-tetrahydro-1H-cyclopropa[a]naphthalene was reduced using 1.1 g. (0.029 mole) of lithium aluminum hydride. The product was converted to the hydrochloride salt which was crystallized from isopropanol-isopropyl ether, weighed 5 g. (100 percent yield) and melted at 200° C. with decomposition.

Analysis:
Calculated for $C_{23}H_{29}N_2OCl$:   C,71.76; H,7.59; N,7.28
Found             :   C,71.20; H,7.53; N,7.24

EXAMPLE 7 trans-1-(4-Phenyl-1,2,3,6-tetrahydro-1-pyridinylmethyl)-1a,2,3,7b-tetrahydro-1H-cyclopropa[a]naphthalene Hydrochloride Hemihydrate.

A suspension of 6.3 g. (0.019 mole) of trans-1-(4-phenyl-1,2,3,6-tetrahydro-1-pyridinylcarbonyl)-1a,2,3,7b-tetrahydro-1H-cyclopropa[a]naphthalene was reduced using 1.46 g. (0.038 mole) of lithium aluminum hydride. The crude product was converted to the hydrochloride salt which was crystallized from isopropanol-isopropyl ether, weighed 5.3 g. (79 percent yield) and melted at 219°–221° C. with decomposition.

Analysis:
Calculated for $C_{46}H_{54}N_2Cl_2O$:   C,76.54; H,7.54; N,3.88
Found             :  C,76.86; H,7.31; N,3.85

EXAMPLE 8

Utilizing the procedures of Examples 1–7, the following compounds are prepared by lithium aluminum hydride reduction of the corresponding amide:

cis-1-[4-(4-anisyl)-1-piperazinylmethyl]-1,1a,6,6a-tetrahydro-1H-cycloprop[a]indene is prepared by reduction of cis-1-[4-(4-anisyl)-1-piperazinylcarbonyl]-1,1a,6,6a-tetrahydro-1H-cycloprop[a]indene;

cis-1-[3-(4-fluorophenyl)-1-pyrrolidinylmethyl]-1,1a,6,6a-tetrahydro-1H-cycloprop[a]indene is prepared by reduction of cis-1-[3-(4-fluorophenyl)-1-pyrrolidinylcarbonyl]-1,1a,6,6a-tetrhydro-1H-cycloprop[a]indene;

cis-1-[3-(3-trifluoromethylphenyl)-1-(3-pyrrolinyl)methyl]-1,1a,6,6a-tetrahydro-1H-cycloprop[a]indene is prepared by reduction of cis-1-[3-(3-trifluoromethylphenyl)-1-(3-pyrrolinyl) carbonyl]-1,1a,6,6a-tetrahydro-1H-cycloprop[a]indene;

cis-1-(4-phenyl-1-piperidinylmethyl)-1a,2,3,7b-tetrahydro-1H-cyclopropa[a]naphthalene is prepared by reduction of cis-1-(4-phenyl-1-piperidinylcarbonyl)-1a,2,3,7b-tetrahydro-1H-cyclo-propa[a]naphthalene;

cis-1-[4-(4-tolyl)-1,2,3,6-tetrahydro-1-pyridinylmethyl]-1a,2,3,7b-tetrahydro-1H-cyclopropa[a]naphthalene is prepared by reduction of cis-1-[4-(4-tolyl)-1,2,3,6-tetrahydro-1-pyridinyl-carbonyl]-1a,2,3,7b-tetrahydro-1H-cyclopropa[a]naphthalene;

cis-1-[4-(4-anisyl)-1,2,3,6-tetrahydro-1-pyridinylmethyl]-1,1a,6,6a-tetrahydro-1H-cycloprop[a]indene is prepared by reduction of cis-1-[4-(4-anisyl)-1,2,3,6-tetrahydro-1-pyridinyl-carbonyl]-1,1a,6,6a-tetrahydro-1H-cycloprop[a]indene;

cis-1-[3-(2-anisyl)-1-pyrrolidinylmethyl]-1a,2,3-7b-tetrahydro-1H-cyclopropa[a]naphthalene is prepared by reduction of cis-1-[3-(2-anisyl)-1-pyrrolidinylcarbonyl]-1a,2,3,7b-tetrahydro-1H-cyclopropa[a]naphthalene;

cis-1-[4-(2-ethoxyphenyl)-1-piperidinylmethyl]-1a,2,3,7b-tetrahydro-1H-cyclopropa[a naphthalene is prepared by reduction of cis-1-[4-(2-ethoxyphenyl)-1-piperidinylcarbonyl]-1a,2,3,7b-tetrahydro-1H-cyclopropa[a]naphthalene;

cis-1-(4-benzyl-1-piperidinylmethyl)-1,1a,6,6a-tetrahydro-1H-cycloprop[a]indene is prepared by reduction of cis-1-(4-benzyl-1-piperidinylcarbonyl)-1,1a,6,6a-tetrahydro-1H-cycloprop[a]indene;

cis-1-[4-(4-chlorophenyl)-1-piperazinylmethyl]-1,1a,6,6a-tetrahydro-1H-cycloprop[a indene is prepared by reduction of cis-1-[4-(4-chlorophenyl)-1-piperazinylcarbonyl]-1,1a,6,6a-tetrahydro-1H-cycloprop[a]indene;

trans-1-[4-(4-anisyl)-1-piperidinylmethyl]-1,1a,6,6a-tetrahydro-1H-cycloprop[a]indene is prepared by reduction of trans-1-[4-(4-anisyl)-1piperidinylcarbonyl]-1,1a,6,6a-tetrahydro-1H-cycloprop[a]indene;

trans-1-[4-(3-trifluoromethylphenyl)-1-piperidinylmethyl]-1a,2,3,7b-tetrahydro-1H-cyclopropa[a]napthalene is prepared by reduction of trans-1-[4-(3-trifluoromethylphenyl)-1-piperidinyl-carbonyl]-1a,2,3,7b-tetrahydro-1H-cyclopropa[a]naphthalene;

trans-1-(3-phenyl-1-pyrrolidinylmethyl)-1a,2,3,7b-tetrahydro-1H-cyclopropa[a]naphthalene is prepared by reduction of trans-1-(3-phenyl-1-pyrrolidinylcarbonyl)-1a,2,3,7b-tetrahydro-1H-cyclopropa[a]naphthalene;

trans-1-[3-(4-ethoxyphenyl)-1-(3-pyrrolinyl)methyl]-1a,2,3,7b-tetrahydro-1H-cyclopropa[a]naphthalene is prepared by reduction of trans-1-[3-(4-ethoxyphenyl)-1-(3-pyrrolinyl)carbonyl]-1a,2,3,7b-tetrahydro-1H-cyclopropa[a]naphthalene;

trans-1-[4-(4-fluorophenyl)-1,2,3,6-tetrahydro-1-pyridinylmethyl]-1,1a,6,6a-tetrahydro-1H-cycloprop[a]indene is prepared by reduction of trans-1-[4-(4-fluorophenyl)-1,2,3,6-tetrahydro-1-pyridinylcarbonyl]-1,1a,6,6a-tetrahydro-1H-cycloprop[a]indene;

trans-1-(4-benzyl-1-piperidinylmethyl)-1,1a,6,6a-tetrahydro-1H-cycloprop[a]indene is prepared by reduction of trans-1-(4-benzyl-1-piperidinylcarbonyl)-1,1a,6,6a-tetrahydro-1H-cycloprop[a]indene;

trans-1-(3-phenyl-1-(3-pyrrolinyl)methyl]-1,1a,6,6a-tetrahydro-1H-cycloprop[a]indene is prepared by reduction of trans-1-[3-phenyl-1-(3-pyrrolinyl)carbonyl]-1,1a,6,6a-tetrahydro-1H-cycloprop[a]indene;

trans-1[3-(3-tolyl)-1-pyrrolidinylmethyl]-1,1a,6,6a-tetrahydro-1H-cycloprop[a]indene is prepared by reduction of trans-1-[3-(3-tolyl)-1-pyrrolidinylcarbonyl]-1,1a,6,6a-tetrahydro-1H-cycloprop[a]indene.

FORMULATION AND ADMINISTRATION

The present invention also contemplates novel compositions containing the compounds of the invention as active ingredients. In forming the novel compositions of this invention, the active ingredient is incorporated in a suitable carrier, illustratively, a pharmaceutical carrier. Suitable pharmaceutical carriers which are useful in formulating the tablet of this invention include starch, gelatin, glucose, magnesium carbonate, lactose, malt and the like. Liquid compositions are also within the purview of this invention and suitable liquid pharmaceutical carriers include ethyl alcohol, water, saline, propylene glycol, glycerine, glucose syrup and the like. The physical form of the novel compositions depends in part upon the physical characteristics of the active ingredient. When the active ingredient is a solid, the composition is preferably formulated as a capsule or tablet. When the active ingredient is a liquid, the composition is preferably formulated as a soft gelatin capsule. The preferred composition is a table containing the active ingredient in the form of its non-toxic acid addition salt.

Although small quantities of the active materials of the present invention are effective when minor therapy is involved or in cases of administration to subjects having a relatively low body weight, unit dosages are usually 5 milligrams or above and preferably 25, 50 or 100 milligrams or even higher, depending, of course, upon the emergency of the situation and the particular result desired. Five to 100 milligrams appear to be optimum per unit dose, while usual broader ranges appear to be one to 500 milligrams per unit dose. It is only necessary that the active ingredient constitute an effective amount, i.e., such that a suitable effective dosage will be obtained consistent with the dosage form employed. Obviously, several unit dosage forms may be administered at about the same time.

The following are examples of composition formed in accordance with this invention.

1. Capsules

Capsules of 5 mg., 25 mg., and 50 mg. of active ingredient per capsule are prepared. With the higher amounts of active ingredient, reduction may be made in the amount of lactose.

| Typical Blend for Encapsulation | Per Capsule, mg. |
|---|---|
| Active ingredient, as salt | 5.0 |
| Lactose | 296.7 |
| Starch | 129.0 |
| Magnesium stearate | 4.3 |
| Total | 435.0 mg. |

Additional capsule formations preferably contain a higher dosage of active ingredient and are as follows:

| Ingredients | 100 mg. per Capsule | 250 mg. per Capsule | 500 mg. per Capsule |
|---|---|---|---|
| Active ingredient, as salt | 100.0 | 250.0 | 500.0 |
| Lactose | 231.5 | 126.5 | 31.1 |
| Starch | 99.2 | 54.2 | 13.4 |
| Magnesium stearate | 4.3 | 4.3 | 5.5 |
| Total | 435.0 | 435.0 | 550.0 |

In each case, uniformly blend the selected active ingredient with lactose, starch, and magnesium stearate and encapsulate the blend.

2. Tablets

A typical formulation for a tablet containing 5.0 mg. of active ingredient per tablet follows. The formulation may be used for other strengths of active ingredient by adjustment of weight of dicalcium phosphate.

| | | Per Tablet, mg. |
|---|---|---|
| 1. | Active ingredient, as salt | 5.0 |
| 2. | Corn starch | 13.6 |
| 3. | Corn starch (paste) | 3.4 |
| 4. | Lactose | 79.2 |
| 5. | Dicalcium phosphate | 68.0 |
| 6. | Calcium stearate | 0.9 |
| | Total | 170.1 mg. |

Uniformly blend 1, 2, 4 and 5. Prepare 3 as a 10 per cent paste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredient and are as follows:

A. 50 mg. Tablet

| Ingredients | Per Tablet, mg. |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 mg. |

Uniformly blend the active ingredient, lastose, milo starch and the corn starch. This blend is granulated using water as a granulating medium. The wet granules are passed through an eight mesh screen and dried at 140° to 160° F over night. The dried granules are passed through a number 10 mesh screen and blended with the proper amount of calcium stearate and this blend is then converted into tablets on a suitable tablet press.

B. 100 mg. Tablet

| Ingredients | Per Tablet, mg. |
|---|---|
| Active ingredient, as salt | 100.0 |
| Lactose | 190.0 |
| Dicalcium phosphate | 172.2 |
| Starch | 54.0 |
| Milo starch | 21.6 |
| Calcium stearate | 2.2 |
| Total | 540.0 mg. |

Uniformly blend the active ingredient, lactose, dicalcium phosphate, starch and mil starch. This blend is granulated with water and the wet mass is passed through a number eight mesh screen. The wet granules are dried at 140°–160° F over night. The dried granules are passed through a number 10 mesh screen. These dried granules are blended with the proper weight of calcium stearate and the lubricated granules are then converted into tablets on a suitable tablet press.

3. Intramuscular Injection

| Ingredients | Per ml. |
|---|---|
| 1. Active ingredient | 50.0 mg. |
| 2. Isotonic buffer solution, 4.0: | q.s. to 2.0 ml. |

Procedure
1. Dissolve the active ingredient in the buffer solution.
2. Aseptically filter the solution from step 1.
3. The sterile solution is now aseptically filled into sterile ampoules.
4. The ampoules are sealed under aseptic conditions.

4. Syrup

| Ingredients | Amts./5 cc. |
|---|---|
| 1. Active ingredient | 100.0000 mg. |
| 2. Glycerin | 1.2500 ml. |
| 3. Sorbitol solution 70% | 2.5000 ml. |
| 4. Sodium saccharin | 1.0000 mg. |
| 5. Sodium sucaryl | 10.0000 mg. |
| 6. Methyl p-aminobenzoate | 5.0000 mg. |
| 7. Propyl p-aminobenzoate | 5.0000 mg. |
| 8. Curacao flavor | 0.2500 ml. |
| 9. Water q.s. | 0.0025 ml. |
| | 5.0000 ml. |

Procedure
1. Dissolve 6 and 7 in hot water.

2. This solution, when cool, is mixed with No. 3 and the mixture is stirred until uniform.
3. Dissolve 1, 2, 4, 5 and 8 in this solution and stir until uniform.

Various modifications and equivalents will be apparent to one skilled in the art and may be made in the compounds, compositions, methods, and procedures of the present invention without departing from the spirit or scope thereof, and it is therefore to be understood that the invention is to be limited only by the scope of the appended claims.

What is claimed is:

1. A compound selected from (a) cis and trans isomers of heterocyclic bases having the formula:

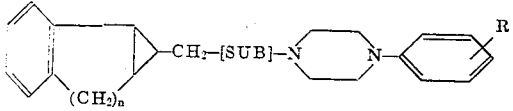

wherein R is selected from the group consisting of hydrogen, lower alkyl, lower alkoxy, trifluoromethyl and halogen of atomic weight less than eighty, $n$ is a positive integer from 1 to 2 inclusive, and (b) acid addition salts thereof.

2. The compound as defined in claim 1, which is trans-1-(4-phenyl-1-piperazinylmethyl)-1a,2,3,7b-tetrahydro-1H-cyclopropa[a]naphthalene.

3. The compound as defined in claim 1, which is trans-1-[4-(4-anisyl)-1-piperazinylmethyl]-1a,2,3,7b-tetrahydro-1H-cyclopropa[a]naphthalene.

4. The compound as defined in claim 1, which is trans-1-(4-phenyl-1-piperazinylmethyl)-1,1a,6,6a-tetrahydro-1H-cycloprop[a]indene.

5. The compound as defined in claim 1, which is cis-1-(4-phenyl-1-piperazinylmethyl)-1a,2,3,7b-tetrahydro-1H-cyclopropa[a]naphthalene.

6. A process for the preparation of heterocyclic bases having the formula:

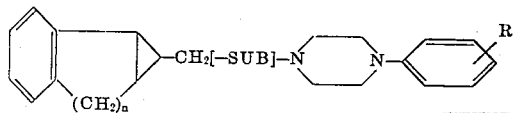

wherein R is selected from the group consisting of hydrogen, lower alkyl, lower alkoxy, trifluoromethyl and halogen of atomic weight less than 80, and $n$ is a positive integer from 1 to 2 inclusive, which comprises the steps of:

1. reacting a carboxylic acid selected from the group consisting of 1,1a,6,6a-tetrahydro-1H-cycloprop[a]indenecarboxylic acid and 1a,2,3,7b-tetrahydro-1H-cyclopropa[a]naphthalenecarboxylic acid with a thionyl halide;
2. reacting the acyl halide prepared in a step (1) with a 4-phenylpiperazine having the formula

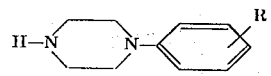

wherein R is as defined above to give an amide having the formula

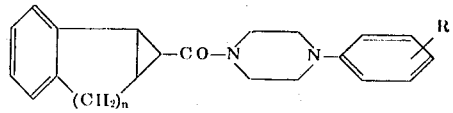

wherein $n$ and R are as defined above.

3. reducing the amide from step (2) with lithium aluminum hydride to produce the trans isomers of compounds having the formula

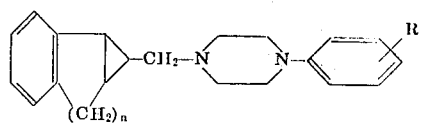

wherein $n$ and R are as defined above.

4. reacting a cis carboxylic acid of step (1) with equimolar amounts of dicyclohexylcarbodiimide and a 4-phenylpiperazine having the formula

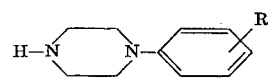

wherein R is as defined above to give a cis amide having the formula

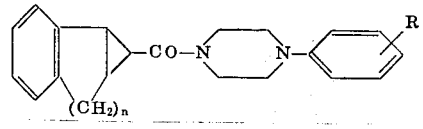

wherein $n$ and R are as defined above.

5. reducing the cis amide prepared in step (4) with lithium aluminum hydride to produce the cis isomers having the formula

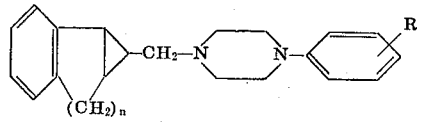

wherein $n$ and R are as defined above.

* * * * *

UNITED STATES PATENT OFFICE
CERTIFICATE OF CORRECTION

Patent No. 3,666,761　　　　　　　　Dated May 30, 1972

Inventor(s) William John Welstead, Jr.

It is certified that error appears in the above-identified patent and that said Letters Patent are hereby corrected as shown below:

Column 13, lines 14 to 18, the formula should appear as shown below instead of as in the patent:

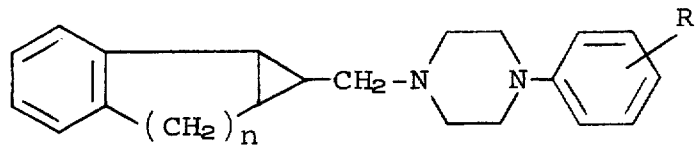

Column 13, lines 38 to 42, the formula should appear as shown below instead of as in the patent:

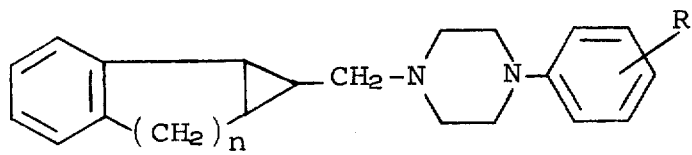

Signed and sealed this 26th day of September 1972.

(SEAL)
Attest:

EDWARD M. FLETCHER, JR.
Attesting Officer

ROBERT GOTTSCHALK
Commissioner of Patents